May 16, 1961   P. M. STIGLIC ET AL   2,984,213
POSITIONING DEVICE
Filed March 24, 1958   2 Sheets-Sheet 1

Inventors
Paul M. Stiglic
Gene L. Mrava

May 16, 1961  P. M. STIGLIC ET AL  2,984,213
POSITIONING DEVICE
Filed March 24, 1958  2 Sheets-Sheet 2
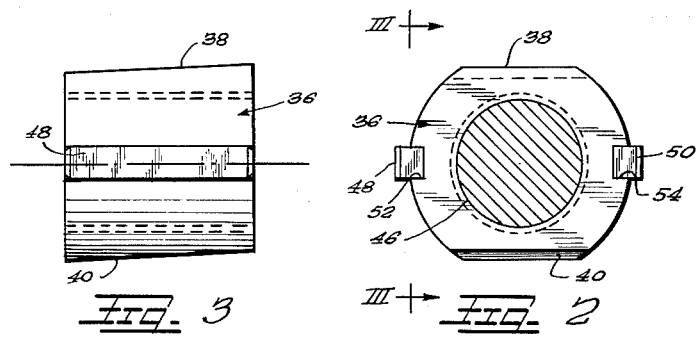
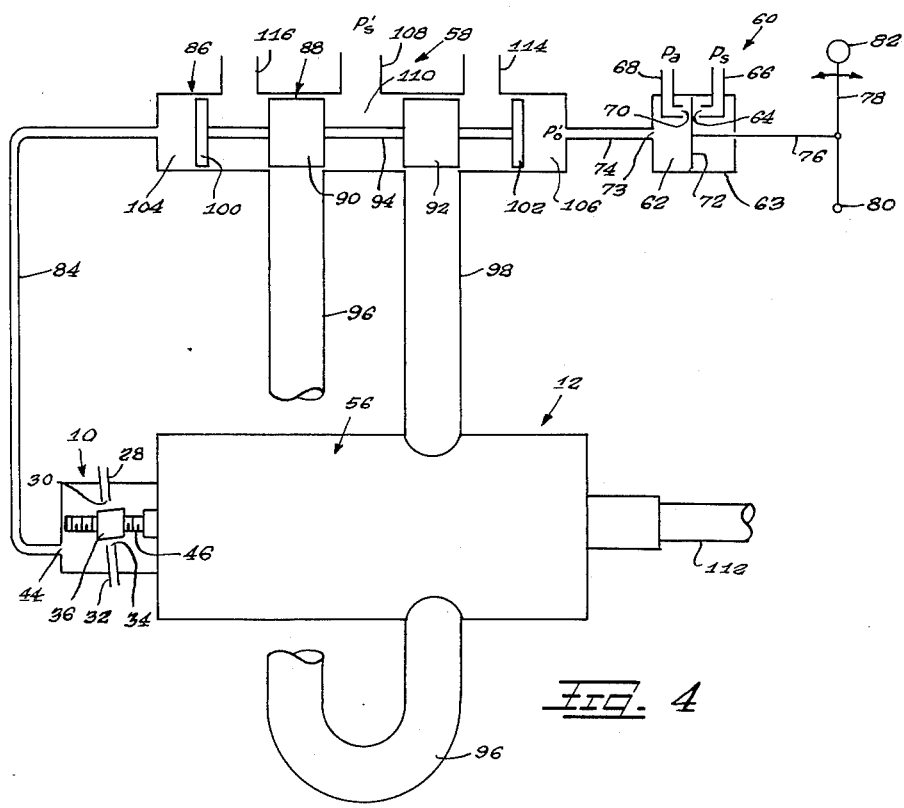
Inventors
Paul M. Stiglic
Gene L. Mrava

United States Patent Office 2,984,213
Patented May 16, 1961

2,984,213

POSITIONING DEVICE

Paul M. Stiglic, Wickliffe, and Gene L. Mrava, Cleveland, Ohio, assignors to Thompson Ramo Wooldridge Inc., a corporation of Ohio Filed Mar. 24, 1958, Ser. No. 723,245

11 Claims. (Cl. 121—41)

The present invention relates to improvements in positioning devices, and more particularly to a mechanism wherein an input command position is converted to a pressure signal to operate a motor through a control device which receives a feedback pressure signal from the motor.

A control device embodying the features of the present invention may be utilized to receive a position command signal from a remote location to drive a positioning motor. Such positioning devices are used to regulate machines of various types, and are used to control engines, aircraft frame controls, such as ailerons and rudders, machine tool controls, atomic reactor controls, and general devices which require powered positioning in accordance with a command control.

An important feature of the invention is to provide an improved mechanism which will convert the position of an actuating motor to a pressure signal for feeding back to a control device for the motor. The mechanism for converting the position of the motor to a pressure signal may be utilized in other applications, and generally provides a mechanism which generates an output pressure signal which is very accurately and sensitively responsive to the displacement of the valve member.

Another feature of the invention is to provide an improved power positioning device which employs a rotary air motor as the actuator. In an air motor actuator as employed in the present invention, disadvantages heretofore present with other types of actuators are avoided in that leaks in a pneumatic system are not fatal, as is the case if a system of hydraulic design is used, high operating temperature is not a critical factor in the pneumatic system, exposure to radiation does not adversely affect the pneumatic system to the extent that it will in electrical and hydraulic systems, and in aircraft applications and in many other uses a supply of pressurized air is constantly available eliminating the necessity of a separate power supply.

In a construction of the type embodying the features of the present invention, a power actuator is employed in the form of a rotary air motor which is preferably a roots type air motor. The air motor is reversible and is operated through forward and reverse air lines through which a pressurized air supply flow is controlled by a double acting spool valve. The spool valve is operated by a pressure balancing arrangement which has plungers or like pressure responsive devices at each end, with the plunger at one end being subjected to an input pressure signal, and the plunger at the other end being subjected to an opposing feedback pressure signal. Input pressure signals are derived from a mechanism such as that having a closed control chamber with inlet and outlet orifices that are opposed and a movable valve member therebetween which simultaneously controls the flow of air through the inlet and outlet orifices. An output pressure signal is obtained through a line communicating with the chamber and the position of the valve member is controlled by an input displacement command signal.

A feedback signal is obtained from a device such as that having a closed chamber with inlet and outlet orifices and a movable valve member between the orifices which are in opposed relationship. The valve member has surfaces facing the inlet and outlet orifices and moves across the orifices along a path so that movement in one direction will increase the space betwen the surface in one of the orifices and decrease the space between another surface in the other orifice. The valve member is shown in the form of a traveling nut, in one form, positioned by a screw rotated by the actuator motor. A feedback pressure line connects to the chamber and feeds to the pressure responsive surface operating the spool valve with the valve positioned in accordance with the balance of pressures between the feedback signal and the input signal.

An object of the present invention is to provide an improved device for generating a pressure signal varying in accordance with the displacement of a valve member and having advantages over devices heretofore used, such as having reduced clogging tendencies, and requiring only a small degree of input motion to deliver a large flow of fluid at extremely accurately controlled pressures.

Another object of the invention is to provide an improved pressure signal device which is very simple and very reliable in construction and operation.

A further object of the invention is to provide an improved positioning device which obtains a positioning output from the actuator that very accurately reflects and responds to an input command signal in the form of a displacement motion.

A further object of the invention is to provide an improved positioning device which operates to transform a displacement input command signal to a pressure signal and to transform a feedback position signal of an actuator to a pressure signal. Another object is to utilize these pressure signals in an improved pressure balancing control device which operates actuator control air valves.

A still further object of the invention is to provide a controlled positioning device which employs a rotary air motor and which obtains advantages over positioning devices of the types heretofore used.

Other objects and advantages will become more apparent from the teachings of the principles and features of the invention in the disclosure of the preferred embodiments of the present invention in the specification, claims and drawings, in which:

Figure 2 is a vertical sectional view taken along line II–II of Figure 1, and illustrating the valve member in enlarged detail;

Figure 3 is an enlarged detailed view in side elevation of the valve member of Figure 2, and taken generally along line III–III of Figure 2; and Figure 4 is a schematic illustration of a positioning mechanism embodying the principles of the present invention and including the mechanism of Figures 1 to 3.

As shown in the drawings:

Figure 1:
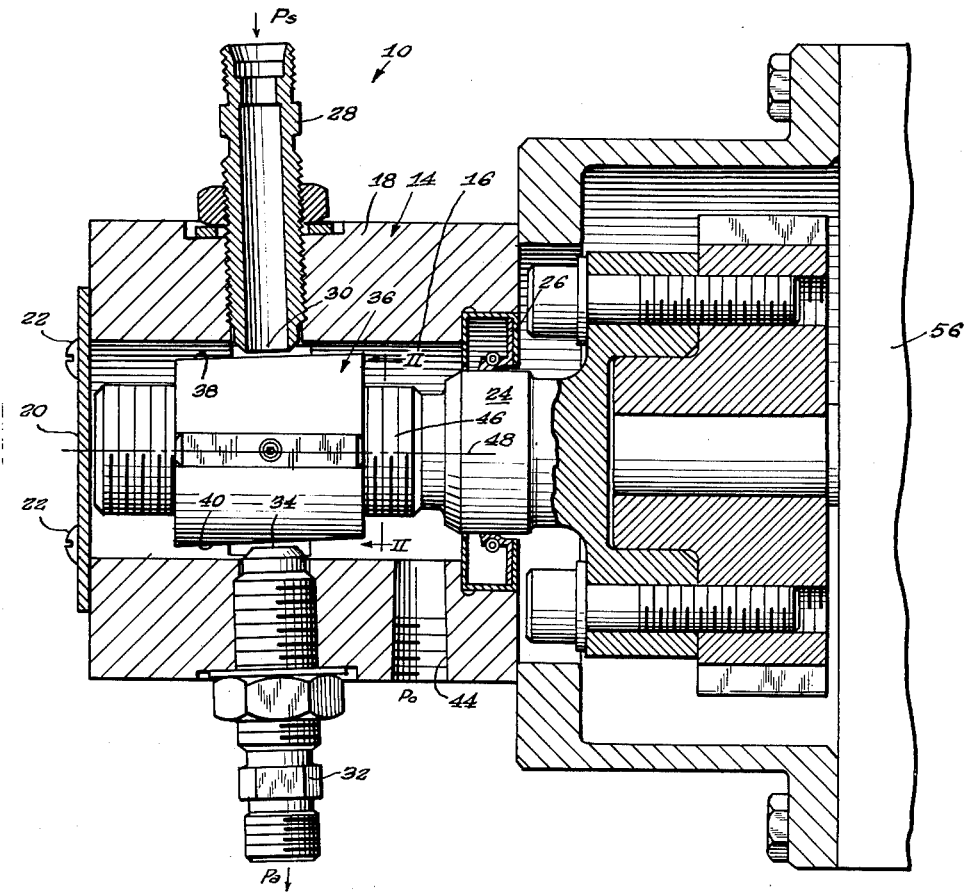
Figure 1 is a vertical sectional view taken through a pressure signal flow controlling device embodying the principles of the present invention.

A valve mechanism 10 is illustrated in detail in Figure 1, and is shown in combination in the positioning mechanism 12 of Figure 4. In the assembly of Figure 4, the valve assembly 10 generates a feedback pressure signal in the manner which will be described.

As to the details of the valve assembly 10, a valve casing 14 is provided forming a closed chamber 16 therein. The casing is illustrated as having a tubular shaped outer wall 18 with an end wall 20 connected across the end of the tubular outer wall 18 to seal the chamber 16 at one end. The end wall 20 is suitably attached to the tubular outer wall 18, such as by screws 22.

At the other end of the chamber 16, a shaft 24 passes into the chamber within the tubular outer wall 18 and the end of the chamber is closed by the shaft 24 and shaft 24 is sealed with respect to the wall 18 by an annular rotary seal 26.

An inlet conduit 28 leads through the wall 18 of the casing and opens into the chamber 16 with an inlet orifice 30. The inlet conduit 28 is supplied with a flow of fluid such as air, at a pressure $P_s$. This supply pressure for the inlet conduit 28, when the device is used in a positioning mechanism such as shown in Figure 4, may be obtained from a suitable compressor. For example, if the positioning mechanism is used in an aircraft installation, the compressed air system of the aircraft may be tapped for the supply.

Leading out from the chamber is an outlet conduit 32. The air flows from the chamber into conduit 32 through an outlet orifice 34. The outlet orifice 34 is positioned across from and opposite the inlet orifice 30.

The effective cross-sectional flow area from the inlet orifice into the chamber 16, and from the chamber 16 through the outlet orifice 32 is controlled by the position of a flow controlling valve member 36.

The valve member 36 has an inlet controlling surface 38 which is positioned across the inlet orifice 30. The valve member 36 also has an outlet surface 40 which is positioned facing the outlet orifice 34.

For controlling the flow into the chamber through the inlet orifice 30, and flow from the chamber through the outlet orifice 34, the valve member 36 is moved along a path which changes the distance between the controlling surface 38 and inlet orifice 30 and the distance between the controlling surface 40 and the outlet orifice 34. The path of movement of the valve member 36 extends in a direction between the inlet and outlet orifices 34 and 30, and generally across the orifices or across the direction of flow therethrough. In one direction of movement of the valve member 36 along its path, the space between the inlet surface 38 and the inlet orifice 30 will increase, and the space between the outlet surface 40 and the outlet orifice 34 will decrease.

In movement of the valve member 36 in the opposite direction along its path, the space between the inlet surface 38 and the inlet orifice 30 will decrease, and the space between the outlet surface 40 and the outlet orifice 34 will increase. Thus, with movement of the valve member 36 along the path in either direction, the pressure within the chamber 16 will be controlled.

To measure the chamber pressure, an outlet flow pressure signal is accommodated by an outlet opening 44 through the wall of the casing 14. The output signal pressure is shown as $Po$ and for sake of convenience will be merely referred to as P.

The outlet conduit 32 normally will discharge into the surrounding atmosphere to a pressure $Pa$.

In a preferred form, the valve member 36 moves in a path extending at right angles to the flow through the orifices, and the inlet and outlet surfaces slope with respect to the path of movement.

The valve member is in the form of a travelling nut mounted on a rotatable screw 46. The axis 48 of the screw defines the path of travel of the nut. The inlet surface 38 on the side of the nut is sloped so that as the nut moves to the right, as shown in Figure 1, the space between the surface 38 and the inlet orifice 30 will increase, and as the nut moves in the other direction the space will decrease. The surface 40 is sloped in the opposite direction so that as the nut moves to the right, as shown in Figure 1, the space between the surface 40 and the orifice 34 will decrease, and as the nut moves to the left, the space will increase.

For improved control the inlet and outlet orifices 30 and 34 preferably face on one parallel to the surfaces 38 and 40. This is done by canting conduits 28 and 32 with their axes at right angles to the surfaces 38 and 40.

As illustrated in the detailed drawings of Figures 2 and 3, which show the valve member 36, the nut is prevented from turning by a pair of keys 48 and 50, which are positioned in grooves, not shown, in the inner surface of the casing wall 18, and which extend into grooves 52 and 54 in the sides of the nut or valve member 36. The keys insure that the nut will not rotate with rotation of the screw 46, and that the flat surfaces 38 and 40 will remain in facing relationship to the inlet and outlet orifices 30 and 34.

The screw 46 rotates when the actuator motor 56 rotates. Thus, the nut or valve member 36 will be driven along the screw in accordance with the rotation of the motor, and will act as a follow-up mechanism to produce a signal in accordance with the rotation of the motor. This follow-up signal is converted to an air pressure signal by the valve mechanism 10, and the feedback air pressure signal is obtained through the opening 44 into the casing 14, and transmitted up to a control mechanism 58.

The control mechanism 58 is shown in the form of a spool valve with pressure balancing means so that its position will be influenced by the feedback signal from the feedback valve assembly 10, and by an input pressure signal obtained from the signal input valve 60, Figure 4.

In some circumstances, an input signal valve such as 60 may be used which has a construction similar to the feedback signal valve 10. In this instance, a command signal would be turned into the valve, and the actuator motor 56 would be rotated in accordance with the input signal.

However, the control valve is shown in a construction provided with an input valve chamber 62 defined by an enclosing casing 63. An air inlet line 66 leads into the chamber 62, and terminates in an inlet orifice 64. Air pressure is delivered to the inlet line 66 at a pressure $Ps$. Leading from the chamber is an air outlet flow line 68, and flow into the line from the chamber is through an outlet orifice 70. The inlet orifice 64 and the outlet orifice 70 are positioned so as to be in spaced facing relationship in order to be controlled by a valve member 72. The flow through the outlet line 68 is shown as being discharged to the surrounding air at a pressure $Pa$.

The valve member 72 is shown in the form of a broad flat flapper which is positioned between the inlet and outlet orifices 64 and 70. The valve member flapper 72 is anchored at its lower end within the chamber and its upper free end moves between the orifices. As the valve member 72 is moved toward the end of the orifice 64, the distance between the inlet orifice and the surface of the valve member 72 decreases, and flow through the inlet orifice 64 decreases. At the same time, the space between the outlet orifice 70 and the other surface of the valve member 72 increases, and the flow from the chamber through the outlet orifice 70 increases. Movement of the valve member 72 in an opposite direction will increase flow through the inlet orifice 64 and increase flow through the outlet orifice 70, thereby increasing pressure in the chamber 62.

The pressure in the chamber is measured through the pressure flow outlet opening 73 which discharges air from the chamber at a pressure $P'o$, which will be more simply referred to as $P'$. The pressure flow through the opening 73 is conducted by a line 74 to the control valve assembly 58.

The input valve member 72 is positioned between the inlet and outlet orifices 74 and 70 by an input signal valve rod 76. The valve rod 76 is connected at one end to the valve member 72 and at the other end to the command signal lever 78. The signal lever may be of a type which delivers an input displacement signal to the valve rod 76, and is shown as pivotally mounted at 80, and provided with a manual grip 82 at the end opposite its pivotal mounting. Thus, the input signal is placed in the machine by the displacement of the lever 78, and this displacement is converted to a pressure signal by the input valve 60.

The pressure input command signal is supplied to the control valve assembly 58 through the output line 74, as shown in Figure 4. The feedback pressure signal is supplied through a line 84 from the feedback valve 10. The control valve 58 has a pressure balancing arrangement and is illustrated with a tubular valve housing 86, which is closed at its ends, and with the pressure input line 74 leading into one closed end, and the feedback pressure line 84 leading into the other closed end. The valve housing 86 has a cylindrical interior which slidably houses a spool valve 88 having a first enlarged control portion 90 and a second enlarged control portion 92 connected by a valve stem 94. The control portion 90 controls flow through a forward air line 96, leading to the air motor 56 and the enlarged valve portion 92 controls air flow to reversing air line 98, leading to the motor 96. It will be recognized that the positions of these lines is not critical, and that their positions can be reversed.

The valve stem 94 continues on beyond both ends of the enlarged control portions of the spool valve 88 and the stem extensions carry at one end a plunger 100 and at the other end a plunger 102. The plunger or piston 100 faces the feedback air line 84, and closes a chamber 104 at the end of the cylindrical valve housing, with the chamber 104 being subjected to feedback air pressure. The plunger or piston 102 faces the input pressure line 74, and forms a chamber 106 at the end of the cylindrical valve housing 86 which is subjected to input air pressure. The spool valve 88 is free floating within the chamber 86, and it will thus be seen that it will rest at a balanced position and will move in either direction as soon as there is a pressure differential between the chambers 104 and 106 for the feedback and input air pressure.

Input air pressure for operating the air motor 56 is delivered at a pressure P's through a supply line 108. The air enters a chamber 110 between the enlarged control portions 90 and 92 of the spool valve 88, and within the cylindrical valve housing 86. It will be observed from Figure 4 that as the spool valve moves in either direction, either the reversing air conduit 98 or the forward air conduit 96 will be uncovered to permit a flow of operating air to the motor. When one line is uncovered, the other will be closed to supply air but will be vented to exhaust.

The motor is provided with an output drive shaft 112 to operate a mechanism which is to be positioned in accordance with the input command signal. The enlarged portions 90 and 92 of the spool valve are of a size so that when one of the conduits 96 or 98 is opened to communicate with the operating air line 108, the other air line will be vented to an exhaust line.

Air exhaust line 114 communicates with the valve housing to provide an exhaust for the reversing conduit 98. Exhaust air conduit 116 is provided for the forward conduit 96. When the spool valve 88 moves to the left, the motor 56 will rotate in a forward direction, and supply air will flow through forward conduit 96, and will exhaust through reversing conduit 98. When the motor is to be operated in reverse direction, the spool valve 88 is moved to the right, as shown in Figure 4, and operating air will be supplied through the reversing conduit 98, and will be exhausted through the forward conduit 96.

In operation of the device, when the control lever 78 is pushed inwardly toward the valve 60, the valve member 72 is moved away from the inlet orifice and toward the outlet orifice. This will increase the pressure in the chamber 62, and this will increase the pressure signal to the control valve 58 through the input signal line 74. The increase in air pressure will force the piston 102 to the left, as shown in Figure 4, and permit a flow of operating air from the line 108 down through the forward conduit 96 to drive the motor 56 in a forward direction. When the motor rotates in a forward direction, the feedback valve member or nut 36 will move to the right, as shown in Figure 1, thereby moving the inlet surface 38 away from the inlet orifice 30, and moving the outlet surface 40 toward the outlet orifice 34. This will cause an increase in pressure in the feedback chamber 16, and this increased pressure will be transmitted to the feedback line 84 to move the valve piston 100 to the right, as illustrated in Figure 4. This will counterbalance the pressure at the other end of the valve spool, and the motor 56 will continue to rotate until the feedback pressure equals the inlet pressure. At this time, the valve spool 88 will be centered so as to terminate any flow of air to the motor 56, and stop the motor. The motor will thus be positioned in accordance with the input command signal. When the motor is to be operated in the opposite direction, the lever 78 is drawn away from the valve casing 63, thereby decreasing the pressure in the chamber 62. This decreased pressure will drop the pressure behind the piston 102, and the spool valve 88 will move to the right, thereby transmitting operating air down through the reversing air conduit 98 to operate the motor 56 in the reverse direction. This will move the nut valve member 36 in a direction so as to decrease the pressure in the feed back chamber 16, and this decreased pressure will be translated to the chamber 104 in the valve housing 86 until the valve spool 88 becomes pressure balanced, and the control portions 90 and 92 move squarely over the conduits 96 and 98.

While other types of actuators may be employed, an air motor 56 is preferably used to deliver the power control. An air motor possesses advantages over other types of systems, such as which employ electrical and hydraulic energy. Leaks in a pneumatic system are not fatal, as is the case in hydraulic systems. Further, the present arrangement is capable of operating at high temperatures which would be above the operating range of pneumatic systems. Where the control system is to be employed in an environment where exposure to radiation is necessary, the present system remains operable, and radiation will not have an adverse effect, as it will in many electrical and hydraulic systems to an extent whereby certain components become inoperative. The present system is extremely well suited for use in aircraft because of the above advantages. Also, in aircraft applications, a supply of pressurized air is constantly available at the pressure discharge. This eliminates the necessity of providing a separate power supply such as a hydraulic pump or electric generator.

While various types of air motors may be employed, applicants have found that numerous advantages are obtained in utilizing a motor of the type known to the art as a roots type air motor. Advantages are attained over a vane type motor or over an air turbine. The roots type motor has much less friction, since the only moving parts in contact are the timing gears and, therefore, instantaneous and full response can be attained. The reduction of friction losses also reduces the size per unit of power output. The lubrication problem is also greatly reduced, since there is little contact between the parts and this is important in installations such as where high temperatures are encountered. The mechanism makes possible higher speeds because of reduced friction.

As compared with an air turbine, the roots type motor can be run at lower speeds without the provision of a speed reduction, whereas an air turbine is an inherently high speed machine, and requires complex reduction mechanism to reduce speed and multiply the torque. Further, the problems of instantaneous response and inertia are present. With the present motor arrangement, simple reversal can be attained by the arrangement of the plumbing system. This is not possible with many other types of motors.

As an example of applications in which special advantages are obtained with a mechanism construction in accordance with the teachings of the invention, the device may be used for the control of a variable exhaust nozzle. Use is also found for positioning inlet guide vanes, and the device may be employed to control a movable compressor stator. The advantages of the arrangement may be employed for the control of reactor dynamic or shim rods, and the device may be used for actuating air frame components.

It will be recognized that in some installations a constant external load may occur on the actuator motor. These external loads may be compensated for by mechanical brakes, or by a one-way drive, such as a worm gear motor. However, inasmuch as the spool valve arrangement illustrated provides a positive block of the flow conduits, the air motor is positively stopped, since it depends on flow for rotation. Other variations of the valve might be employed such as by throttling the inlet or exhaust to obtain the correct pressure drop to provide a balancing torque.

Thus, it will be seen that we have provided an improved control mechanism and improved mechanism for generating a pressure signal which meet the objectives and advantages hereinbefore set forth. The feedback mechanism is simple in construction and operates reliably in its function to put out a signal proportional to the change of position of the motor. The overall system is reliable and accurate and serves as a responsive control mechanism possessing advantages for uses in various environments.

I have, in the drawings and specification, presented a detailed disclosure of the preferred embodiment of our invention and it is to be understood that we do not intend to limit the invention to the specific form disclosed, but intend to cover all modifications, changes and alternative constructions and methods falling within the scope of the principles taught by our invention.

We claim as our invention:

1. A pressure signal device comprising means defining a closed chamber, means forming an inlet orifice opening into said chamber for accommodating a flow in the chamber, means forming an outlet orifice opening from said chamber and positioned in opposite facing relationship and spaced from said inlet orifice, a flow control valve member movable between said orifices in a path extending intermediate the orifices, an inlet control surface on the valve member facing said inlet orifice and sloped in a direction with respect to said path whereby the space between the surface and the inlet orifice will increase as the valve member moves in one direction along said path, an outlet control surface on the valve member facing said outlet orifice and sloped in a direction whereby the space between the outlet control surface and outlet orifice will decrease as the valve member moves in said one direction, means connected to said valve member to move it in said path, and means defining an opening in said chamber for receiving a pressure signal output flow from the chamber.

2. A pressure signal device comprising means defining a closed chamber, means forming an inlet orifice opening into said chamber for accommodating a flow in the chamber, means forming an outlet orifice opening from said chamber and positioned in opposite facing relationship and spaced from said inlet orifice, a flow control valve member positioned between said orifices, an inlet control surface on the valve member facing said inlet orifice, an outlet control surface on the valve member facing said outlet orifice, means for moving the valve member in either direction along a path extending along a line passing between said orifices and generally across the direction of flow through said orifices wherein movement in one direction will increase the space between said inlet control surface and said inlet orifice and decrease the space between said outlet control surface and said outlet orifice and respectively decrease and increase said spaces with movement in opposite directions, and means defining an opening in said chamber for receiving a pressure signal output flow from the chamber.

3. A pressure signal device comprising means defining a closed chamber, means forming an inlet orifice opening into said chamber for accommodating a flow in the chamber, means forming an outlet orifice opening from said chamber and positioned in opposite facing relationship and spaced from said inlet orifice, nut and screw members positioned between said orifices with one of said members fixed against rotation and movable axially in a path normal to the direction of flow through said orifices and the other member rotatable to drive said one member along the path, an inlet control surface on said one member facing the inlet orifice and sloped relative to the orifice to increase the space from the surface to the inlet orifice with movement in one direction and decrease the distance with movement in the other direction, an outlet control surface on said one member facing the outlet and sloped relative to the orifice to decrease the space from the surface to the outlet orifice with movement in said one direction and increase the distance with movement in said other direction, and means defining an opening in said chamber for receiving a pressure signal output flow from the chamber.

4. A pressure signal device comprising means defining a closed chamber, means forming an inlet orifice opening into said chamber for accommodating a flow in the chamber, means forming an outlet orifice opening from said chamber and positioned in opposite facing relationship and spaced from said inlet orifice, a screw member extending axially between the orifices and in a direction substantially across the direction of flow through the orifices, a flow control valve member positioned between the orifice and having threads for engaging the threads of the screw to move the valve member axially thereAlong, an inlet control surface on the valve member facing said inlet orifice and sloped in a direction with respect to said screw member axis whereby the space between the surface and the inlet orifice will increase as the valve member moves in one direction along said screw member and the space will decrease as the valve member is moved in the other direction, an outlet control surface on the valve member facing said outlet orifice and sloped in a direction whereby the space between the outlet control surface and the outlet orifice will decrease as the valve member moves in said one direction along the screw and will increase as the valve member moves in the other direction, and means defining an opening in said chamber for receiving a pressure signal output flow from the chamber.

5. A control system comprising a control mechanism including a positionable control member, means for generating a command pressure signal corresponding to the position of said control member, and a responding mechanism including a pressure responsive operator connected to said pressure signal means, said operator positioned in accordance with an input position suppled by said control member, a pressure signal device connected to be moved along a path by said operator, means defining a closed chamber, means forming an inlet orifice opening into said chamber for accommodating a flow in the chamber, means forming an outlet orifice opening from said chamber and positioned in opposite facing relationship and spaced from said inlet orifice, a flow control valve member positioned between said orifices, an inlet control surface on the valve member facing said inlet orifice, an outlet control surface on the valve member facing said outlet orifice, means for guiding said valve member in movement in either direction along said path extending along a line passing between said orifices and generally across the direction of flow through said orifices with the path located wherein movement in one direction will increase the space between said inlet control surface and said inlet orifice and decrease the space between said outlet control surface and said outlet orifice and respectively decrease and increase said spaces with movement in the opposite direction, and means defining a pressure signal opening in said chamber for receiving a pressure signal output flow from the chamber and connected to said responding mechanism whereby said pressure responsive operator will control said valve member in accordance with the positioning of the control member.

6. A control system comprising a pressure balanced operator, a positionable control means connected to supply an input pressure signal to the operator, a drive mechanism connected to be controlled by the operator and positioned in accordance with the input signal produced by said control means, and a feedback mechanism connected to supply a pressure feedback pressure signal to the operator and including a chamber having an inlet orifice and an outlet orifice, a valve member simultaneously controlling flow through both of the orifices and positioned between the orifices and movable in a first direction to increase flow through the inlet orifice and to decrease flow through the outlet orifice and in a second direction to respectively decrease and increase flow through said orifices, the feedback pressure signal being determined by the position of the valve member, said valve member positioned by said drive mechanism, and means defining a pressure signal opening in the chamber connected to said pressure balanced operator to supply the feedback signal thereto.

7. A control system comprising a pressure signal device, means defining a closed chamber, means forming an inlet orifice opening into said chamber for accommodating a flow in the chamber, means forming an outlet orifice opening from said chamber and positioned in opposite facing relationship and spaced from said inlet orifice, a flow control valve member positioned between said orifices, an inlet control surface on the valve member facing said inlet orifice, an outlet control surface on the valve member facing said outlet orifice, a reversible motor for moving the valve member in either direction along a path extending along a line passing between said orifices and generally across the direction of flow through said orifices wherein movement in one direction will increase the space between said inlet control surface and said inlet orifice and decrease the space between said outlet control surface and said outlet orifice and respectively decrease and increase said spaces with movement in the opposite direction, means defining a pressure signal opening for receiving a pressure signal from the chamber dependent on the position of the valve member, a control for operating the motor in either direction, a pressure responsive operator connected to the control and connected to said pressure signal opening for receiving a feedback signal, and means responsive to an input signal connected to the control whereby the control will be operated by said input signal and said feedback signal and the motor will be driven in accordance with the input signal.

8. A pressure signal device comprising a pressure balanced operator, a motor controlled by said pressure balanced operator to be driven to a position controlled by an input signal, an input signal chamber having inlet and outlet orifices in spaced opposed relationship, an input signal valve member located between said orifices and movable to simultaneously control flow through both of the orifices, means controlling the position of the valve member in accordance with an input signal, and an input signal line connected to said chamber and to said pressure balanced operator, a feedback signal mechanism including a closed feedback signal chamber having an input and an output orifice positioned in spaced opposing relationship, a feedback valve member positioned in said chamber and having surfaces facing said orifices, and moving thereacross in a path to increase the space to the inlet orifice and decrease the space to the outlet orifice with movement in one direction and respectively decrease and increase said space with movement in the other direction, said valve member connected to be moved by said motor, and a pressure signal line connected to said feedback chamber and connected to said pressure balanced operator to actuate the operator until the input signal pressure is balanced.

9. A control system comprising means defining a closed chamber, means forming an inlet orifice opening into said chamber for accommodating a flow in the chamber, means forming an outlet orifice opening from said chamber and positioned in opposite facing relationship and spaced from said inlet orifice, a flow control valve member movable between said orifices in a path extending intermediate the orifices, an inlet control surface on the valve member facing said inlet orifice and sloped in a direction with respect to said path whereby the space between the surface and the inlet orifice will increase as the valve member moves in one direction along said path and will decrease as the valve member moves in the other direction, an outlet control surface on the valve member facing said outlet orifice and sloped in a direction whereby the space between the outlet control surface and the outlet orifice will decrease as the valve member moves in said one direction and will increase as the valve member moves in the other direction, a motor connected to drive said valve member in either direction, a pressure responsive operator connected to drive the motor to move the valve member in a direction dependent on position, a pressure line connected to said chamber and to said operator to vary its position with pressure, and means connected to supply an input signal to the operator to influence its position and drive the motor to a position reflecting the input signal.

10. A control system comprising a reversible rotatable air motor, a valve means connected to direct pressurized air to drive the motor in either direction, a signal responsive control device connected to influence the position of the valve means, means for delivering an input signal to the control, a feedback signal generator including a closed feed back signal chamber having an input and an output orifice positioned in spaced opposing relationship, a feedback valve member positioned in said chamber and having surfaces facing said orifices and moving thereacross in a path to increase the space to the inlet orifice and decrease the space to the outlet orifice with movement in one direction and respectively decrease and increase said space with movement in the other direction, said valve member connected to be moved by said motor, and a pressure signal conduit connected to said chamber and to said control device to transmit a pressure signal thereto to feed back a signal indicative of the position of the motor whereby the motor is rotated to a position in accordance with said input signal.

11. A control system comprising a pressure balanced operator, a motor controlled by said pressure balanced operator, an input signal mechanism including an input signal chamber having inlet and outlet orifices in spaced opposed relationship, an input signal valve member located between said orifices and movable to simultaneously control flow through both of the orifices, means controlling the position of the valve member in accordance with an input signal, and an input signal line connected to said chamber and to said pressure balanced operator, and a feedback signal mechanism including means defining a closed feedback chamber, means forming an inlet orifice opening into said chamber for accommodating a flow in the chamber, means forming an outlet orifice opening from said chamber and positioned in opposite facing relationship and spaced from said inlet orifice, a screw member extending axially between the orifices and in a direction substantially across the direction of flow through the orifices and driven by said motor, a flow control valve member positioned between the orifice and having threads for engaging the threads of the screw to move the valve member axially therealong, an inlet control surface on the valve member facing said inlet orifice and sloped in a direction with respect to said screw member axis whereby the space between the surface and the inlet orifice will increase as the valve member moves in one direction along said screw member and the space will decrease as the valve member is moved in the other direction, an outlet control surface on the valve member facing said outlet orifice and sloped in a direction whereby the space between the outlet control surface and the outlet orifice will decrease as the valve member moves in said one direction along the screw and will increase as the valve member moves in the other direction, and a pressure feedback outlet conduit connected to said feedback chamber and connected to said operator to act in opposition to said input pressure signal whereby the motor will be rotated to a position dictated by said input signal.

References Cited in the file of this patent

UNITED STATES PATENTS

| | | |
|---|---|---|
| 2,177,098 | Doe et al. | Oct. 24, 1939 |
| 2,243,603 | MacMillin et al. | May 27, 1941 |
| 2,503,397 | Le Valley | Apr. 11, 1950 |
| 2,565,929 | Onde | Aug. 28, 1951 |
| 2,823,685 | Anderson et al. | Feb. 18, 1958 |

FOREIGN PATENTS

| | | |
|---|---|---|
| 500,864 | Germany | June 27, 1930 |